US012651504B2

(12) United States Patent
Kondo et al.

(10) Patent No.: US 12,651,504 B2
(45) Date of Patent: Jun. 9, 2026

(54) ARTICLE SUPPLY DEVICE

(71) Applicant: BANDAI CO., LTD., Tokyo (JP)

(72) Inventors: Hajime Kondo, Tokyo (JP); Tatsushi Ikarashi, Tokyo (JP); Hiroki Kobayashi, Tokyo (JP); Nobuo Kurokawa, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 287 days.

(21) Appl. No.: 18/542,711

(22) Filed: Dec. 17, 2023

(65) Prior Publication Data

US 2024/0212413 A1 Jun. 27, 2024

(30) Foreign Application Priority Data

Dec. 22, 2022 (JP) ................................ 2022-206077

(51) Int. Cl.
*G07F 11/04* (2006.01)
*G07F 9/02* (2006.01)
*G07F 11/00* (2006.01)

(52) U.S. Cl.
CPC ............ *G07F 9/026* (2013.01); *G07F 11/004* (2020.05); *G07F 11/04* (2013.01)

(58) Field of Classification Search
CPC ....................................................... G07F 9/026
See application file for complete search history.

(56) References Cited

U.S. PATENT DOCUMENTS 8,322,262 B2 * 12/2012 Ryu ....................... A23P 20/20
242/348
2015/0179017 A1 * 6/2015 Rudek ..................... G07F 11/54
221/186
2022/0237553 A1 * 7/2022 Kondo .................... G07F 11/54

FOREIGN PATENT DOCUMENTS

| | | | |
|---|---|---|---|
| CN | 108109265 | A | 6/2018 |
| JP | 4936576 | B1 | 5/2012 |
| JP | 2013149067 | A | 8/2013 |
| JP | 2021039400 | A | 3/2021 |

(Continued)

OTHER PUBLICATIONS

China National Intellectual Property Administration (CNIPA), Chinese First Search Report for Chinese Patent Application 202311516926l, Aug. 27, 2025.

(Continued)

*Primary Examiner* — Gene O Crawford
*Assistant Examiner* — Ayodeji T Ojofeitimi
(74) *Attorney, Agent, or Firm* — IMAIZUMI IP LAW, PLLC; Toshikatsu Imaizumi

(57) ABSTRACT

An article supply device capable of detecting the presence or absence of articles and supplying the articles, includes a main body, an accommodation unit for accommodating the articles, a supply unit for supplying the articles accommodated in the accommodation unit, an up and down moving pin (detection unit) for detecting the presence or absence of the articles accommodated in the accommodation unit, a transmission unit for transmitting a signal indicating the absence of articles accommodated in the accommodation unit, and a sold-out display unit for displaying the absence of the articles accommodated in the accommodation unit. The transmission unit and the sold-out display unit are configured to operate integrally based on a detection operation of the detection unit.

16 Claims, 10 Drawing Sheets

(56) References Cited

FOREIGN PATENT DOCUMENTS

JP 2022141353 A 9/2022

OTHER PUBLICATIONS

China National Intellectual Property Administration (CNIPA), Chinese First Office Action for Chinese Patent Application 2023115169261, Aug. 27, 2025.

Japan Patent Office(JPO), Office Action for Patent Application No. 2022-206077, Nov. 5, 2024.

Japan Patent Office(JPO), Office Action for Patent Application No. 2022-206077, Jan. 15, 2025.

* cited by examiner

ARTICLE SUPPLY DEVICE

CROSS-REFERENCE TO RELATED APPLICATIONS

The disclosure of Japanese Patent Application No. 2022-206077 filed on Dec. 22, 2022 including specification, drawings and claims is incorporated herein by reference in its entirety.

TECHNICAL FIELD

The present invention relates to an article supply device.

BACKGROUND

For example, Patent Document 1 discloses a toy capable of supplying an article. The toy is configured so that one of spherical articles accommodated in a supply box may be taken out from a take-out port located at a lower part of a main body thereof by performing a rotation operation of an operation portion provided a near side of the main body.

PRIOR ART

Patent Documents

[Patent Document 1] Japanese Utility Patent Application Publication No. S62-78998

SUMMARY

Technical Problem

A toy disclosed in the Patent Document 1, which may be referred to an article supply device, is a device for supplying a shaped article, but is not configured so as to detect the presence or absence of the articles accommodated in the supply box.

It is an object of the present invention to provide an article supply device capable of detecting the presence or absence of articles.

Solution to Problem

One of the aspects of the present invention is an article supply device capable of supplying an article. The article supply device comprises a main body, an accommodation unit which accommodates articles, a supply unit, which supplies one of the articles accommodated in the accommodation unit, a detection unit, which detects the presence or absence of the articles accommodated in the accommodation unit, a transmission unit, which transmits a signal indicating that there is no accommodated article in the accommodation unit, and a sold-out displaying unit, which indicates no article is accommodated in the accommodation unit, wherein the transmission unit and the sold-out displaying unit are configured so that the transmission unit and the sold-out display unit can be integrally operated by a detection operation of the detection unit.

Advantageous Effect of Invention

According to the present invention, it is possible to provide an article supply device capable of detecting the presence or absence of such articles.

DETAILED DESCRIPTION

An article supply device according to an embodiment of the present invention will be described, referring to drawings. Regarding the orientation (directions) set forth below in the explanation, a front face side of the article supply device is set as a front when the article supply device is viewed from the front face side so that front and back directions thereof (front side or back side), left and right directions thereof (right side or left side) and up and down directions thereof (upper side or lower side) are shown based thereon. Each of these directions is shown by using an arrow in the figures.

Figure 1:
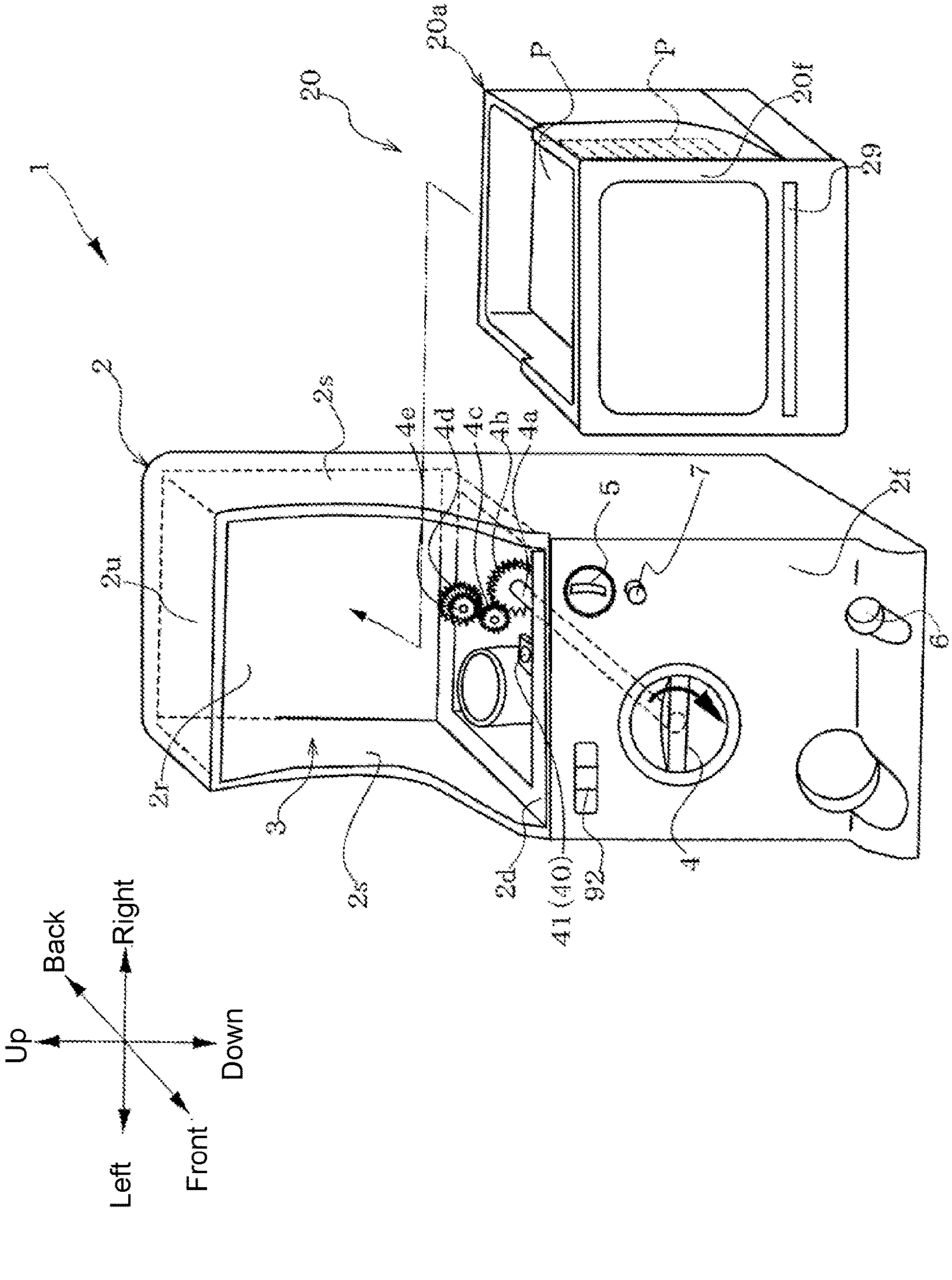
FIG. 1 is a schematic perspective view of an article supply device according to the present invention, showing a state where an accommodation unit is detached from a main body.
Figure 2:
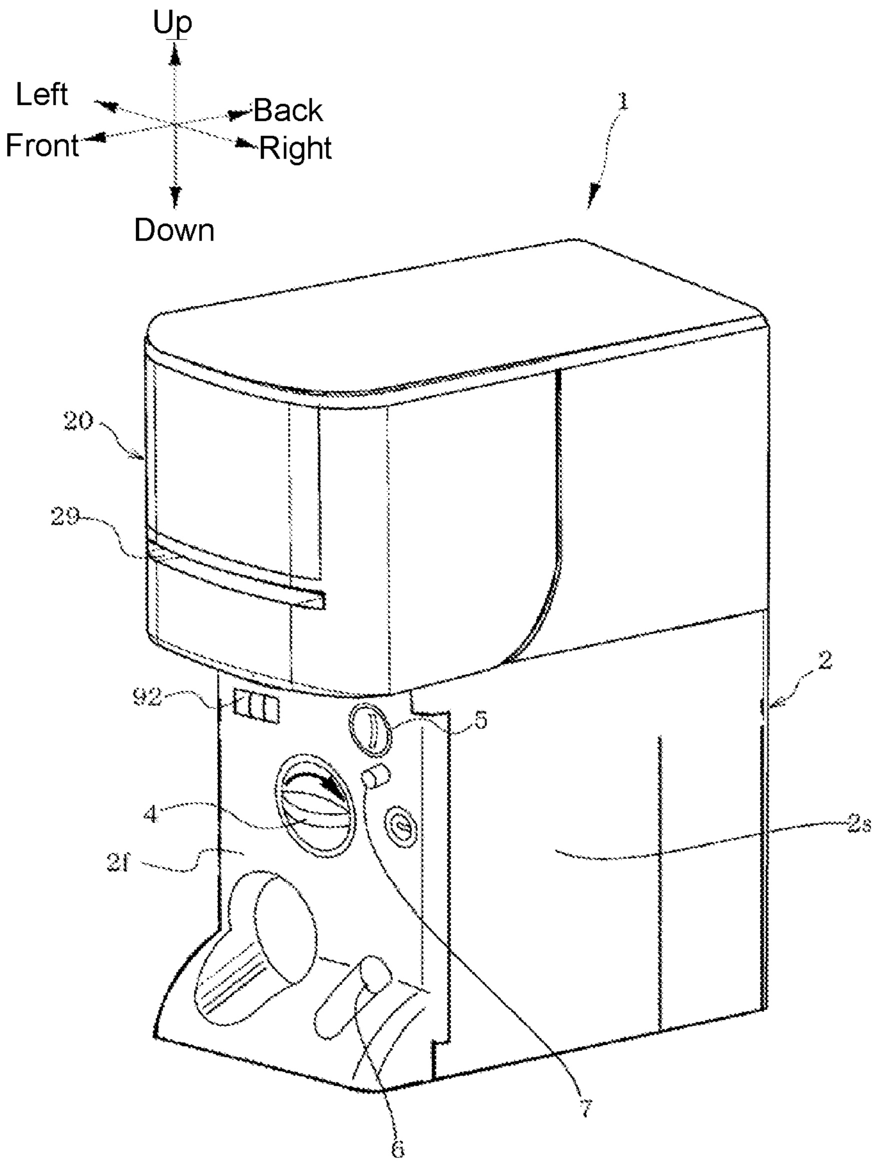
FIG. 2 is a perspective view of the article supply device in a state where the accommodation unit is attached to the main body.

FIG. 1 is a schematic perspective view showing a state of an article supply device 1 according to an embodiment of the present invention in which the accommodation unit 20 is detached from the main body 2. FIG. 2 is a perspective view of the article supply device 1 in which the accommodation unit 20 is attached to a main body thereof. As shown in FIGS. 1 and 2, the article supply device 1 comprises a main body portion 2 forming a box-shaped structure with a front wall 2*f*, left and right side walls 2*s*, rear wall 2*r*, a top wall 2*u*, and a bottom wall (not shown). Various operational components are provided on the front wall 2*f*, including, for example, a coin insertion section 5 for accepting payment for an article P, an operation unit 4 for allowing a supply of the article P by a rotation operation, a return port 6 for returning cash as needed, a cash return button 7 and the like. Additionally, on an upper part side of the front wall 2*f*, an attachment unit 3 is provided with a large opening on a front face side thereof and a front face upper side thereof. The attachment unit 3 is configured so that the accommodation unit 20 which can accommodate articles P and discharge an article P from the front supply port 29 is detachable.

Here, the term "articles P" refers to thin items, such as sheet-like printed material, cards, thin cases, and other relatively thin, flat, sheet-like items which can be stacked and arranged within the accommodation unit 20.

Each of these units will be explained below. The operation unit 4 is configured to be rotatable, for example, in a clockwise direction when viewed from the front side (in the direction of the arrow shown in the figure), subject to payment of consideration. For instance, after a user inserts a coin(s) into the coin insertion section 5, he or she rotates the operation unit 4. As a result, an article P is discharged through the supply port 29 provided on the front side of the accommodation unit 20.

The coin insertion section 5 for cash is configured to have a slit-like opening capable of inserting coins, wherein the opening is formed in a circular depression. Additionally, the return port 6 is configured so that when the inserted coins are returned in response to an operation of the cash return button 7, the retuned coins can be taken from the device.

The attachment unit 3, as mentioned earlier, has a substantially rectangular opening structure surrounded by the left and right side walls 2*s*, the rear wall 2*r*, the top wall 2*u*, and the appropriately opened bottom wall 2*d*. For example, the attachment unit 3 is configured so that the accommodation unit 20 can be detached by slidably moving the accommodation unit 20 in the front and back directions of the main body portion 2. On the bottom wall 2*d* side of the attachment unit 3, a gear mechanism (gears 4*b*, 4*c*, 4*d*) engageable with gear components of the accommodation unit 20 is provided. In addition, on the bottom wall 2*d* side, a first member 41 of a transmission unit 40 capable of transmitting a signal indicating the presence or absence of an article P, is provided as described later. Further, on a bottom wall portion of the accommodation unit 20, a second member 42 of the transmission unit 40 corresponding to the first member 41, is provided as described later.

Figure 3:
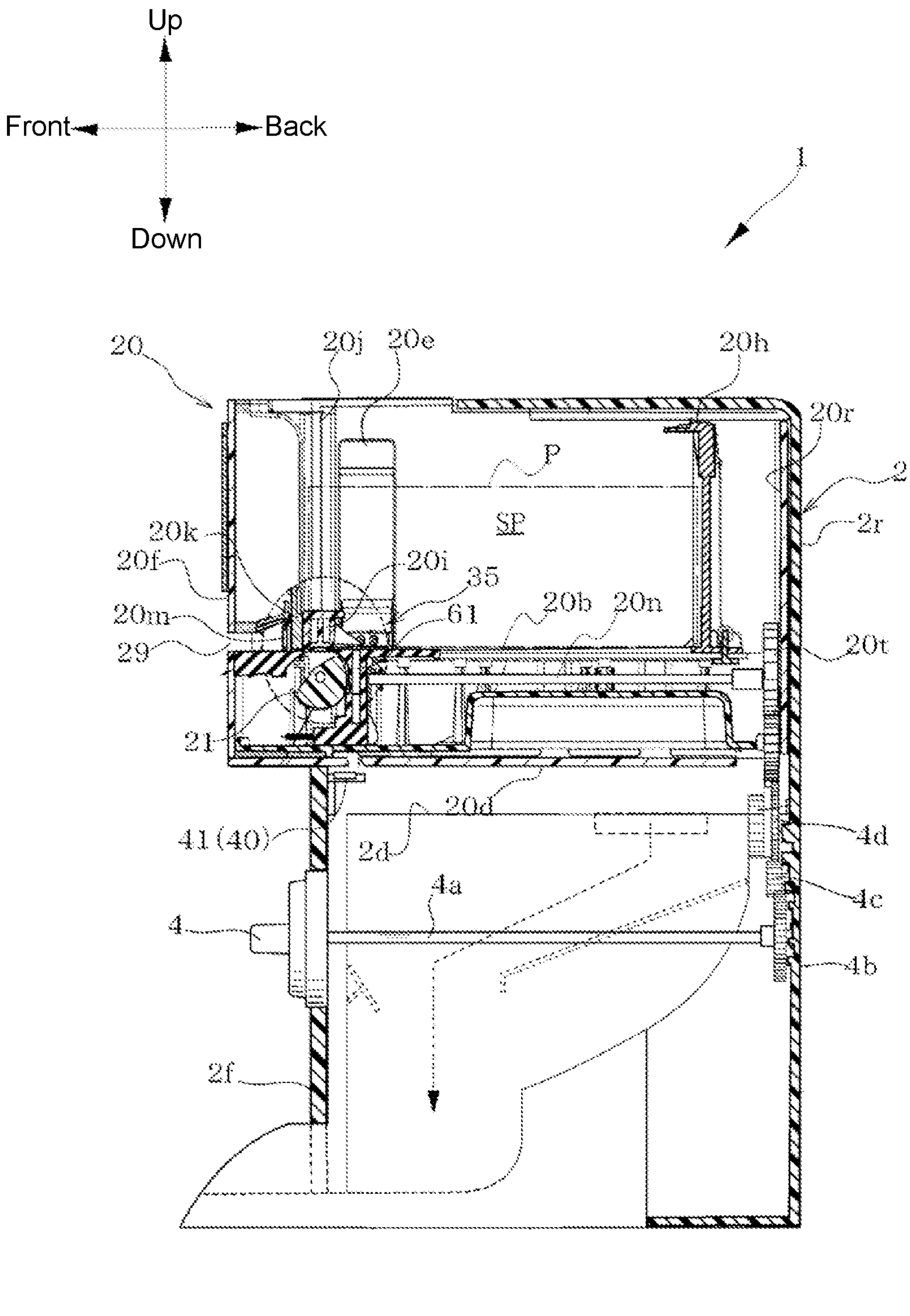
FIG. 3 is a vertical cross-sectional view thereof in the state where the accommodation unit is attached to the main body.
Figure 4:
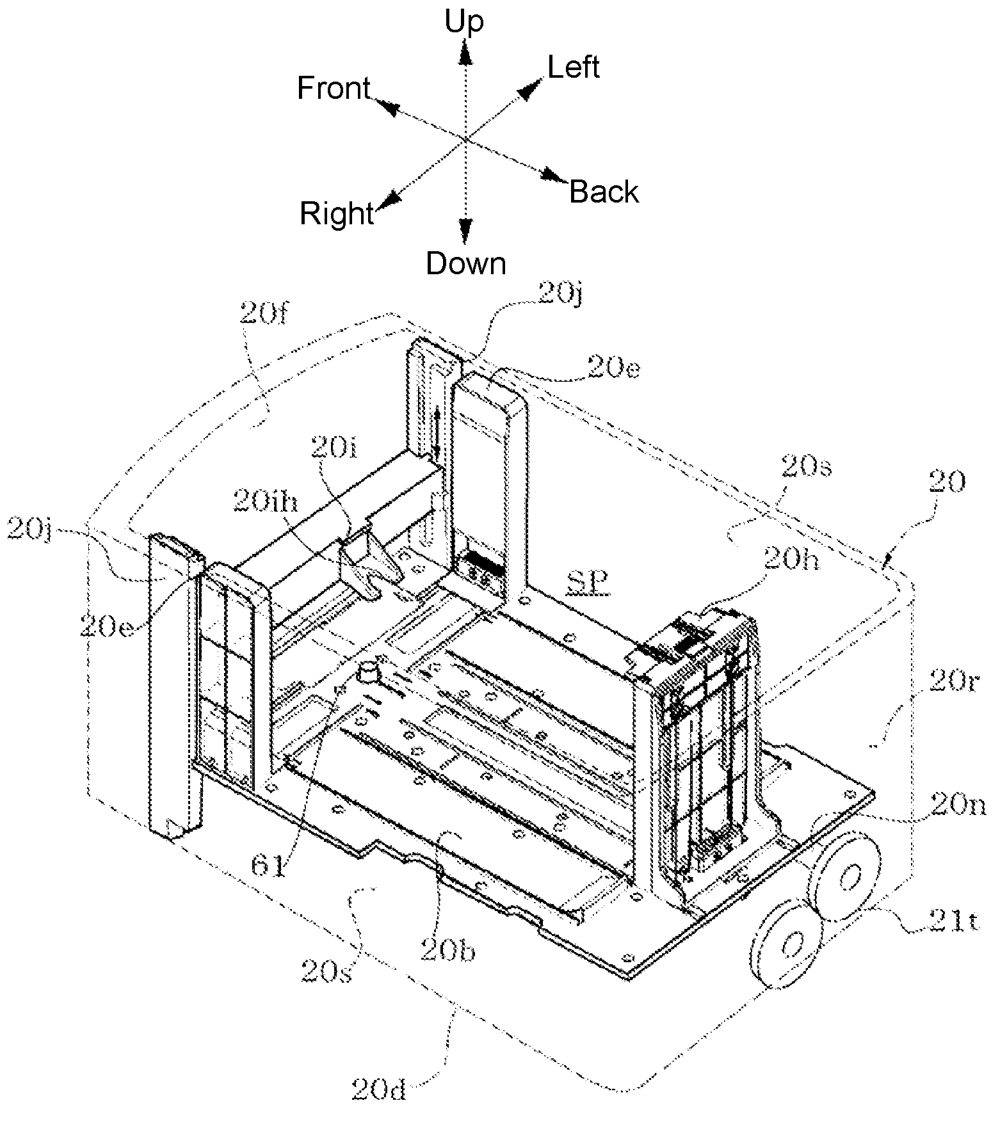
FIG. 4 is a perspective view of an inner structure of the main body.

FIG. 3 is a vertical cross-sectional view of the article supply device 1. FIG. 4 is a perspective view of the internal structure of the accommodation unit 20. As shown in FIG. 3, an operating shaft 4*a* of the operation unit 4 extends rearward. The operating shaft 4*a* extends to the rear wall 2*r*, and a first gear 4*b* is provided at a rear end thereof. The first gear 4*b* is rotatably supported on an inner face of the rear wall 2*r* and forms a gear mechanism by engaging with other gears, namely the second gear 4*c* and the third gear 4*d*. On the other hand, the accommodation unit 20 is equipped with gear components 20*t* along the rear wall portion 20*r* of the accommodation unit 20. In a state where the accommodation unit 20 is attached thereto, the lowermost gear of the gear components 20*t* engages with and is connected to the third gear 4*d*. An article P can be supplied by an operation of the operation unit 4, as described later."

As shown in FIG. 4, the accommodation unit 20 has a box-shaped structure which is formed by the front wall portion 20*f* on the front side, the rear wall portion 20*r* on the rear side, the side wall portions 20*s* on the left and right sides, and the bottom wall portion 20*d* on the bottom side, and which has an opening on an upper side thereof. The internal accommodation space SP thereof is formed as a rectangular space in form of a box. The article placement unit 20*b*, forming the bottom portion of the accommodation space SP, is provided at a high position so as to be flat and spaced from the bottom wall portion 20*d* so that articles may be stacked and accommodated thereon. Additionally, in the accommodation unit 20, a discharge roller 21 of the supply section 35, which discharges an article P from the supply port 29, is provided between the article placement unit 20*b* and the bottom wall portion 20*d* (refer to FIG. 3).

In addition, in the accommodation space SP, a pair of left and right guides 20*e* are provided at a position near the front side of the space, and a rear guide 20*h* is provided at a position toward the rear of the space, so as to rise from the article placement unit 20*b*. Furthermore, on the front side of the left and right guides 20*e*, a pressing part 20*i* is provided to press the articles P downward from an upper side thereof in a state where the articles P are accommodated and stacked. The pressing part 20*i* is a rectangular weight having a longer side in the left-right directions and is movably held in the up-and-down directions by rail-shaped holding sections 20*j* each of which has a groove formed on the front side of the left and right guides 20*c*.

Moreover, the left and right guides 20*e* are provided movably in the left-right directions on the article placement unit 20*b*, and the rear guide 20*h* is movably provided in the front-back directions on the article placement unit 20*b*. Therefore, the articles P of different sizes can be accommodated in a stacked state, by moving the left and right guides 20*e* and the rear guide 20*h*.

On the front side of the pressing part 20*i*, a front end guide part 20*k*, which gets engaged in article discharge, is provided along the pressing part 20*i*. This front end guide part 20*k* is arranged just behind a swingable shutter 20*m* which opens and closes the supply port 29. The front end guide part 20*k* guides the articles P one by one during the discharge, and is adjustable in height from the article placement unit 20*b* and is adjusted according to the thickness of the articles P.

Figure 5:
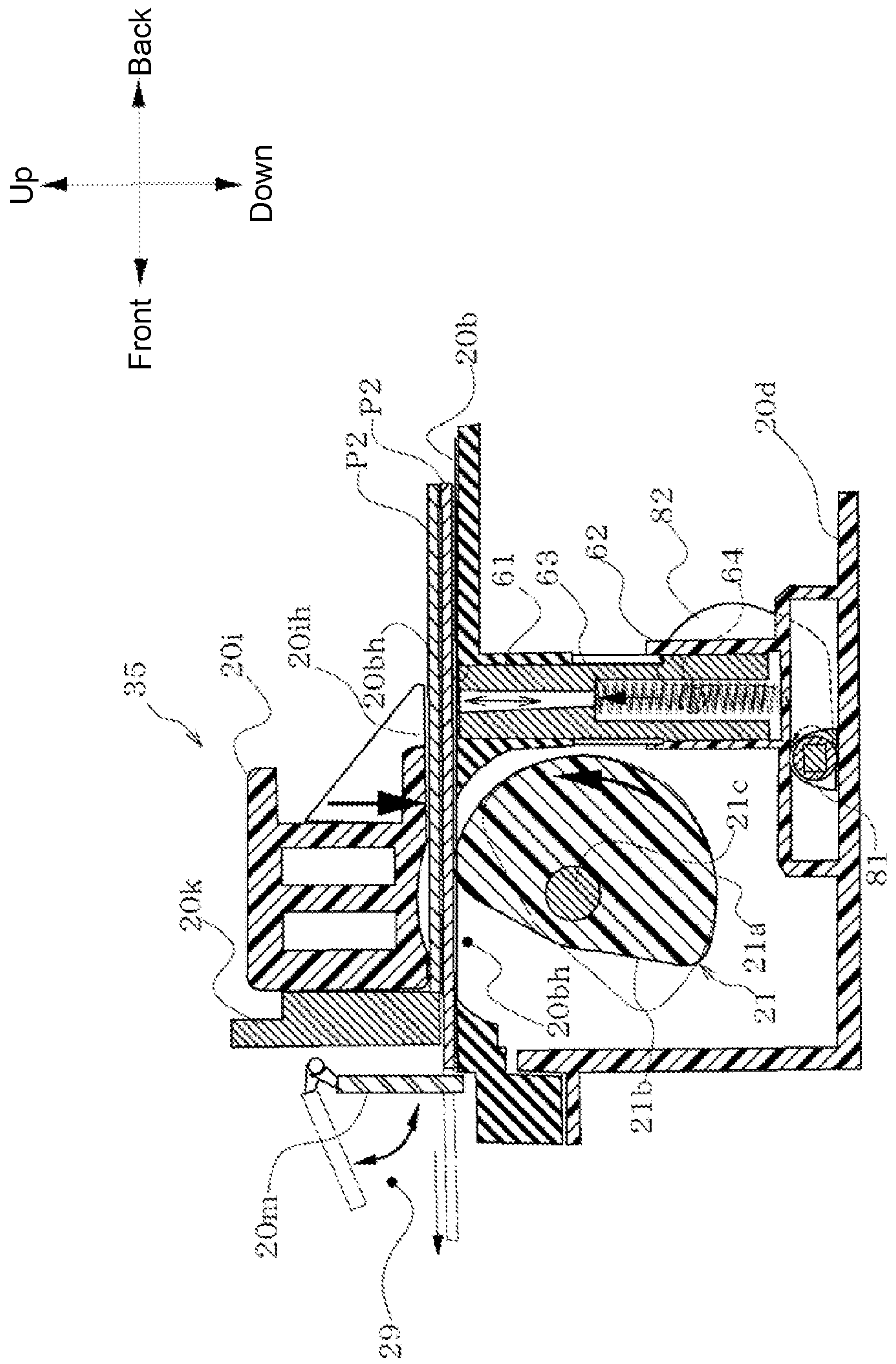
FIG. 5 is an enlarged cross-sectional view of an article supply unit and a detection unit.
Figure 6:
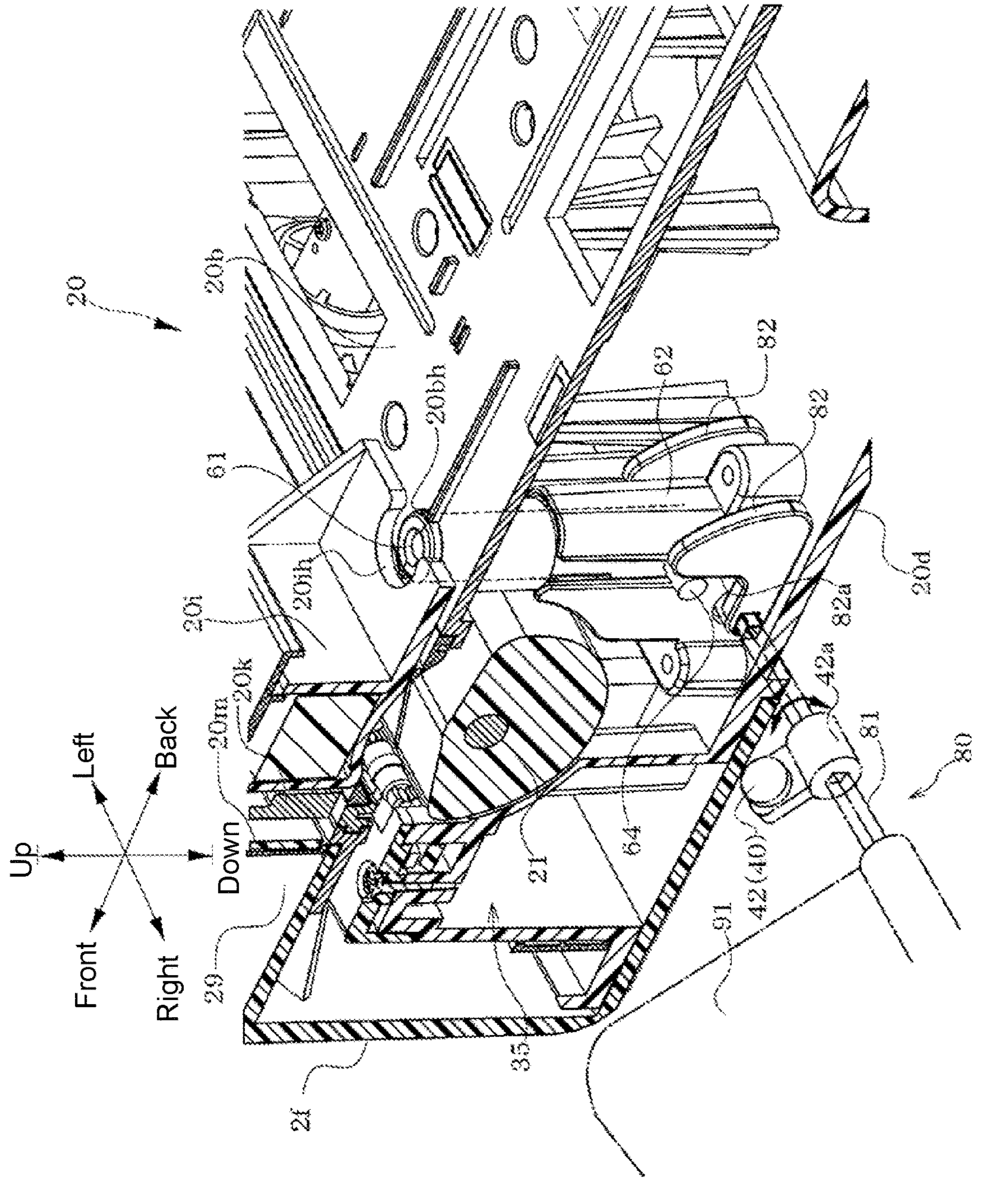
FIG. 6 is an enlarged cross-sectional and perspective view of a main part of the supply unit and the detection unit.

FIG. 5 is an enlarged cross-sectional view of the supply section 35 of the accommodation unit 20 and an up and down moving pin 61 (detection section). FIG. 6 is an enlarged perspective view of the supply section 35 and the up and down moving pin 61. The discharge roller 21 is provided as a part rotating along a horizontal direction so as to be located below the article placement unit 20*b* and to face the pressing part 20*i*. As shown in a side view shown in FIG. 5, the discharge roller 21 has an arc outer face 21*a* and a non-arc outer face 21*b* having a small-diameter than that of the arc outer surface 21*a*. Therefore, when rotated about the rotation axis 21*c*, the outer arc surface 21*a* is brought in contact with a lower face of the article P pressed downward by the pressing part 20*i*. By the rotation in this contact state of the outer are surface 21*a*, the article P is pushed forward. In other words, the outer arc face 21*a* protrudes slightly from the placement opening 20*bh* formed in the article placement unit 20*b* and is brought in contact with the lower face of the article P, so that the article P is slid forward and discharged from the supply port 29. In the discharge (supply) of the articles P by the supply section 35, the articles P are discharged one by one in a sequential order from the bottommost article P stacked and arranged in the accommodation unit 20.

Additionally, the discharge roller 21 is connected to a connection shaft 20*n* (refer to FIG. 3) extending from one axis portion of the gear components 20*t* provided along the rear wall portion 20*r* toward the discharge roller 21 side (front side), and a gear such as a helical gear etc. (not shown) provided on the front side of the connection shaft 20*n*. Therefore, when the accommodation unit 20 is attached to the main body portion 2, the discharge roller 21 is rotationally driven by the operation unit 4, which becomes operable by the coin insertion.

As shown in FIGS. 5 and 6, the up and down moving pin 61 capable of contacting the article P from a lower side of the article placement unit 20*b* is provided on the rear side of the discharge roller 21, as a detecting portion which detect the presence or absence of articles P. This up and down moving pin 61 is movably held by a pin holding part 62 and is biased upward by a compressive coil spring 63 inside the pin so that, when there is an article(s) P, it is pushed down toward a lower side of the article placement unit 20*b*. However, when there is no article P, it protrudes above the article placement unit 20*b* from the placement opening 20*bh*. It is noted that a notch opening 20*ih* corresponding to the placement opening 20*bh* is provided in the pressing part 20*i*, thereby allowing a protruding operation of the up and down moving pin 61.

The up and down moving pin 61 is connected to a link mechanism 80 having a shaft portion 81 as a rotational axis, which is described later. The shaft part 81 of this link mechanism 0 is provided with a sold-out display unit 91, which displays the absence of articles P and a second member 42 of the transmission unit 40 which detects the absence of articles. The second member 42 is provided via a swing member 42*a* extending in the radial direction of the axis portion from the shaft portion 81. The first member 41 paired with the second member 42 is fixedly installed in the front lower part of the attachment unit 3 of the main body part 2 as described above (see FIGS. 1 and 3). The second member 42 is, for example, configured by a magnet, while the first member 41 is configured by a magnetic sensor. Since the second member 42 is provided on the swing member 42*a*, the second member 42 can approach and separate from the fixed first member 41 by a rotation of the shaft portion 81. Therefore, the first member 41 of the magnetic sensor can detect the second member 42 of the magnet, and the detection signal can be transmitted to, for example, a control unit 100 (see FIG. 10).

Figure 7:
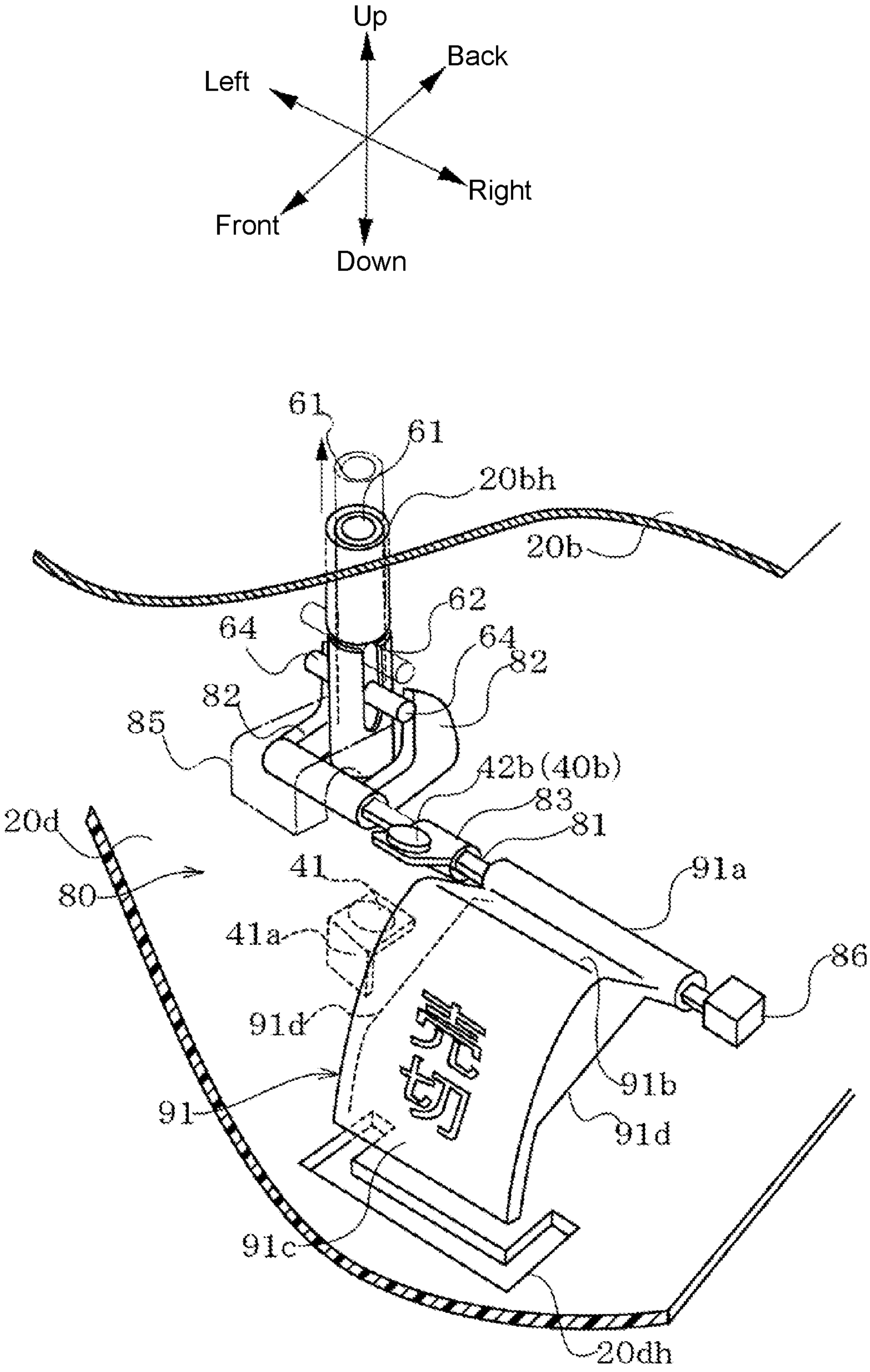
FIG. 7 is a schematic cross-sectional view for illustrating a main part of a link mechanism of the accommodation unit.

FIG. 7 is a schematic perspective view of a main part of a link mechanism of the accommodation unit. Left and right ends of the shaft portion 81 are rotatably supported by bearing portions 85 and 86. On one end side (left side in the figure), a hook-shaped engagement portion 82 extending in a direction of the rotational radius of the shaft portion 81 is provided. The tip side of the shaft portion 81 can be engaged with the engaging projection 64 (referred to as "another member" in the present invention) of the up and down moving pin 61. A pair of these engagement portions 82 is provided at a position where the pin holding part 62 is sandwiched on the left and right sides thereof, wherein the pin holding part 62 holds the up and down moving pin 61 so as to be movable in the left and right directions. Moreover, the engaging face 82*a* of the engagement portion 82, which is formed along the vertical direction (moving directions of the up and down moving pins), is engaged (in a state shown in FIG. 7) with the engaging projection 64.

On the other end side of the shaft portion 81 (right side in the figure), the sold-out display unit 91 for displaying a sold-out state of the articles P is provided so as to extend in the same direction as that of the swing member 42*a*. The sold-out display unit 91 has a mounting base portion 91*a*, a base side plate portion 91*b* extending from the mounting base portion 91*a* in the direction of the rotation radius of the shaft portion, a display plate portion 91*c*, which is curved downward and bended from the base side plate portion 91*b*, and a pair of side plate portions 91*d* reinforcing and connecting both sides of the base side plate portion 91*b* and the display plate portion 91*c*. Therefore, the sold-out display unit 91 has an approximately U-shaped cross-sectional shape (cross-sectional shape orthogonal to the moving direction) in its central portion. Further, an opening 20*dh* having an approximately U-shaped cross-sectional shape is formed so as to correspond to the cross-sectional shape of the sold-out display unit 91 in the bottom wall portion 20*d*, thereby allowing a downward movement of the sold-out display unit 91.

An engaging projections 64 projecting on both sides of the pin holding part 62 is provided on the up and down moving pin 61. And when there is an article P, the engaging projection 64 is positioned on the lower side of the pin holding part 62 and comes into contact with the engaging surface 82*a* of the engagement portion 82, thereby preventing the rotation of the shaft portion 81.

The sold-out display unit 91 is provided so that a force that tends to rotate in a front and lower direction is constantly applied thereto by its own weight. For example, the sold-out display unit 91 is held so as to protrude forward and diagonally upward from the shaft portion 81. Thereby, the sold-out display unit 91 maintains a state in which a rotational force trying to rotate in a front and lower direction is being applied.

Figure 8:
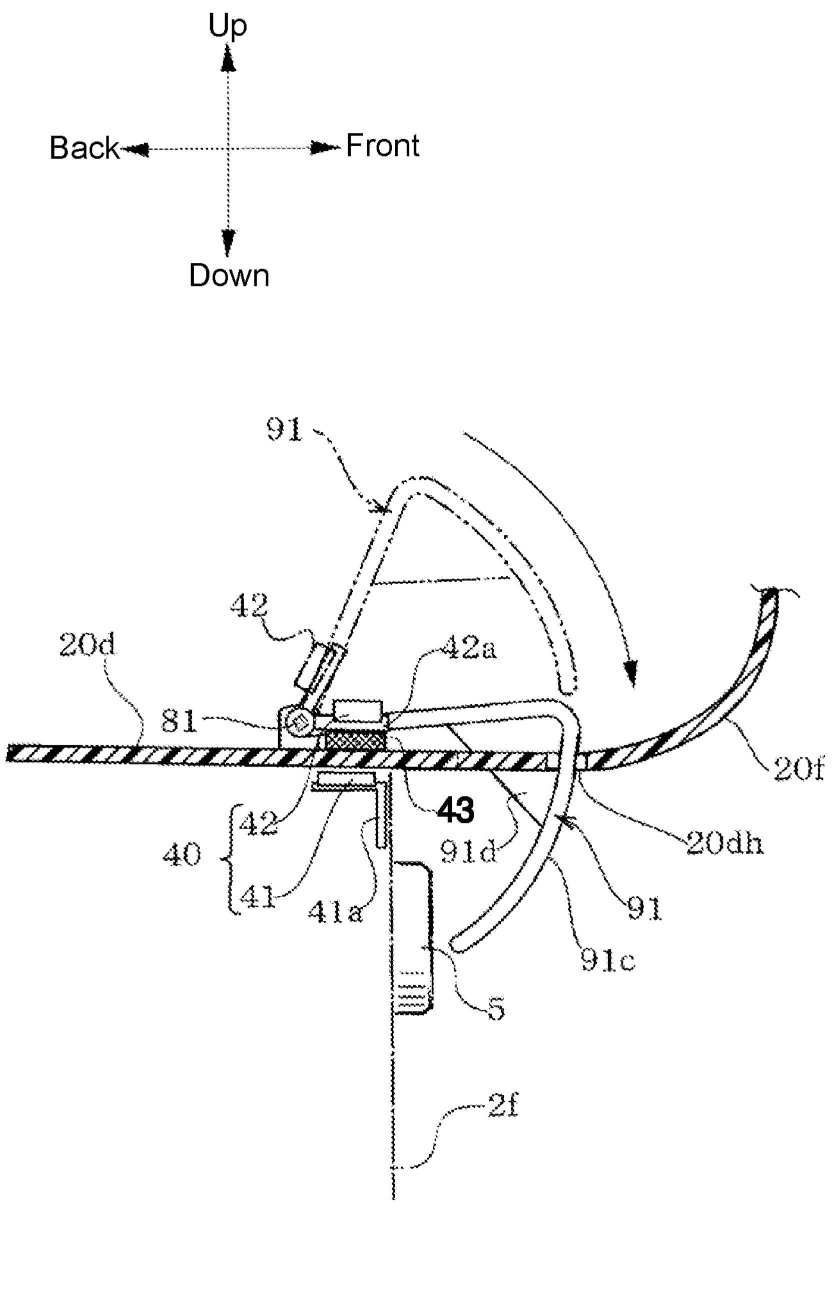
FIG. 8 is a schematic cross-sectional view of a main part for showing an operation of an article sold-out displaying unit and a transmission unit.
Figure 9:
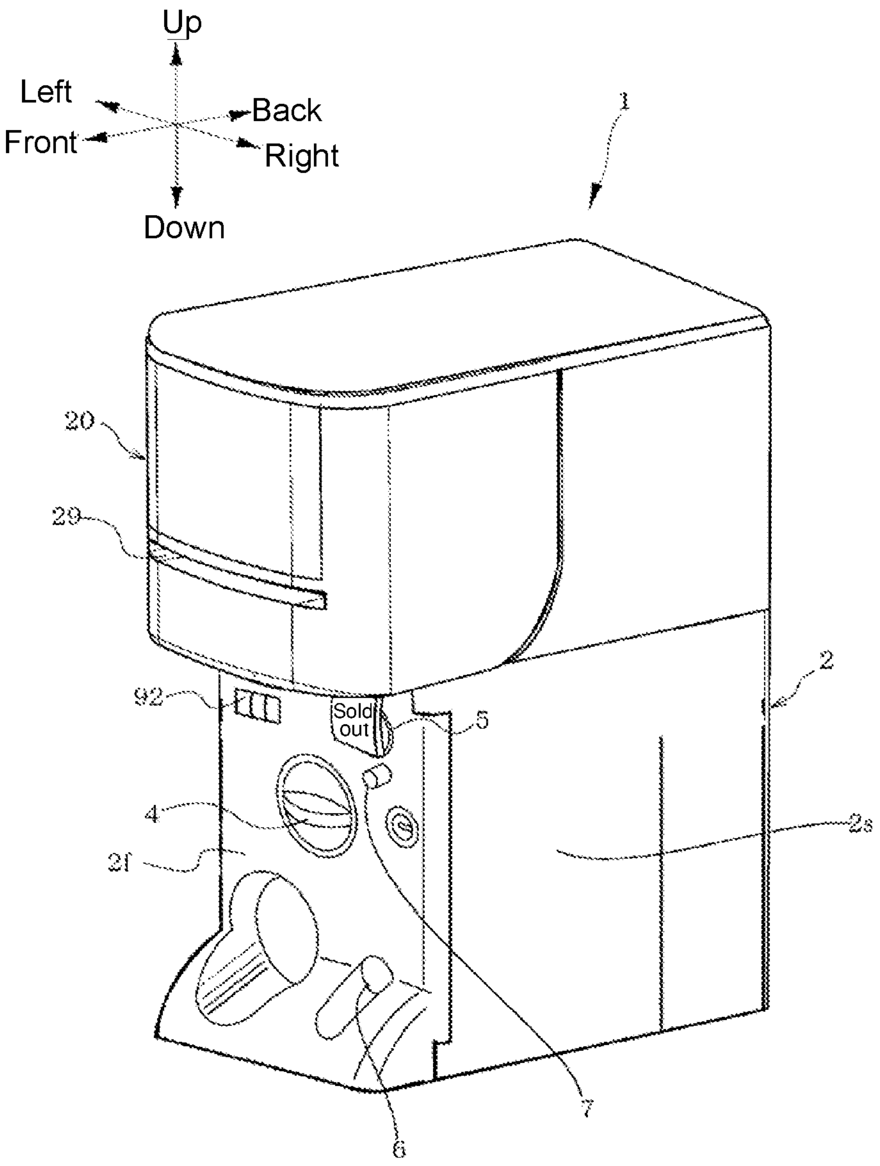
FIG. 9 is a schematic view showing an example of an operation based on a transmission of a signal of the transmission unit.

FIG. 8 is a schematic cross-sectional view of a main part for illustrating an operation of the sold-out display unit 91 and the transmission unit 40 for an article P. FIG. 9 is a perspective view of the article supply device 1 in an operating state of the sold-out display unit 91 for an article P. When articles P are sold out and runs out, the up and down moving pin 61 moves upward due to the compression coil spring 63 (see an imaginary line in FIG. 7), and then the contact between the engaging projection 64 and the engaging surface 82*a* is released. As a result, the sold-out display unit 91 rotates in the front and lower direction due to its own weight together with the shaft portion 81, as shown in FIG. 8. Consequently, the display plate unit 91*c* of the sold-out display unit 91 penetrates the opening 20*dh*. As shown in FIG. 9, the "Sold Out" indication appears on the front face of the front wall 2*f*. At this time, the display plate portion 91*c* is positioned to cover the front side of the coin insertion unit 5. In this way, it becomes impossible to insert coins by covering the coin insertion unit 5 with the sold-out display unit 91.

Furthermore, the second member 42 of the transmission unit 40 provided on the shaft portion 81 rotates by the same angle as that of the sold-out display unit 91 due to the rotation of the shaft portion 81. As a result, as shown in FIG. 8, the second member 42 comes near the first member 41. In other words, the magnet comes close to the magnetic sensor. Thus, when articles P runs out, the second member 42 (magnet) approaches the first member 41 (magnetic sensor), and a magnetic force is detected, thereby allowing the transmission of a detection signal to the control unit 100.

Additionally, as shown in FIG. 8, a metal part 43 is provided on a lower side where the second member 42 has rotated. In other words, since the second member 42 is configured by a magnet, when the second member 42 rotates, it is attracted and held by the metal part 43 made of a ferromagnetic material.

Figure 10:
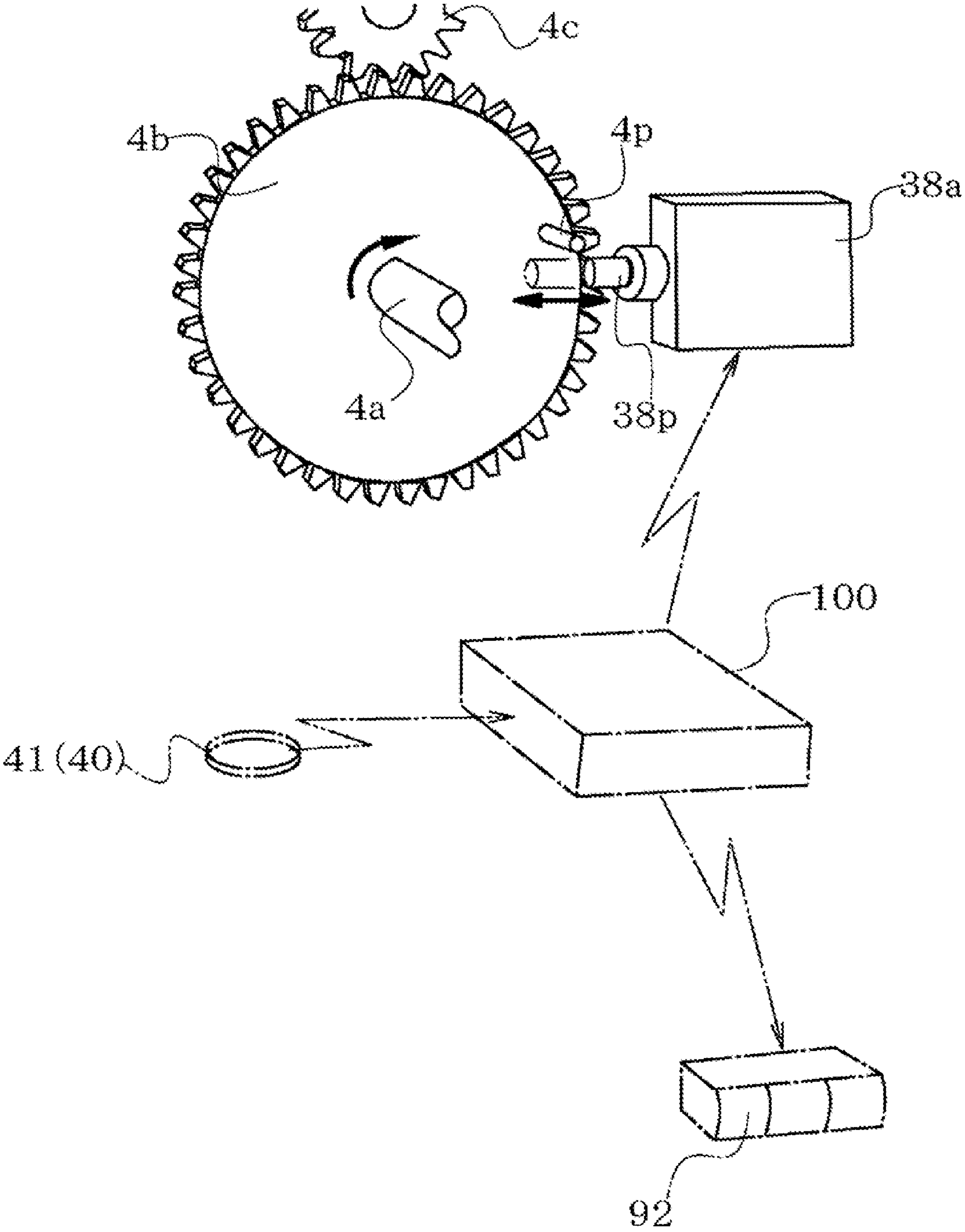
FIG. 10 is a perspective view of an article supply device in a state where the article sold-out displaying unit is operated.

FIG. 10 is a schematic diagram illustrating an example of an operation based on the signal transmission of the transmission unit 40. As described above, based on the signal sent from the first member 41 of the transmission unit 40 to the control unit 100, specifically, an operation such as emitting light from the light-emitting unit 92 or locking the rotation of the gear of the operating unit 4 can be performed, as shown in FIG. 10.

The light-emitting unit 92 is provided on the front wall 2*f* of the main body portion 2 (refer to FIG. 9), and can notify that articles P have run out, for example, by flashing or lighting. In the locking operation, for example, the locking pin 38*p* of the locking drive unit 38*a* is advanced or retracted with respect to the engaging pin 4*p* of the first gear 4*b* attached to the operating shaft 4*a* of the operating unit 4 so as to be engageable with the first gear 4*b*. When the articles P run out, the locking pin 38*p* engages with the engaging pin 4*p*, thereby preventing the rotation of the operating unit 4 so as to be in a lock state.

Furthermore, control based on the signal from the transmission unit 40 by the control unit 100 is not limited to the above-mentioned light emission or locking operations. For example, information that the articles P have run out can be transmitted to the control unit 100 via a communication line, and this information can be used as information for the work of replenishing articles P, or for other management purposes.

As described above, in the article supply device 1 according to this embodiment, the signal transmission operation of the transmission unit 40 and the operation of the sold-out display unit 91 can be integrally operated by using the detection operation of the up and down moving pin 61 as a trigger. Therefore, it is possible to simultaneously perform the operations of two members with the different functions. As a result, when the articles P run out, for example, while direct indication thereof can be visually performed by the sold-out display unit 91, information, which is an electrical signal converted from the positional displacement operation, can be transmitted.

Also, since the integrated operation of the transmission unit 40 and the sold-out display unit 91 is a rotational operation, gravity can be used as a driving force source for the positional displacement from an initial position (a waiting position) to an operating position (a lower position), for example by making the rotation angle less than 90 degrees.

In the article supply device 1 according to the present embodiment, when the transmission unit 40 and the sold-out display unit 91 are integrally configured so as to be attached to the same shaft portion 81, and project in the same direction with respect to the shaft portion 8, the structure around the axis of the shaft portion 81 can be simplified.

In the article supply device 1 according to the present embodiment, the engaging portion 82 extending in a direction orthogonal (intersecting direction) to the axis center of the shaft portion 81 is configured so that the engagement thereof is made in the lower position (when the articles P is present) of the engaging projection 64 provided so as to be projected from the up and down moving pin 61, and the engagement is released when in the upper position (when no article P is present). Therefore, the shaft portion 81 can be rotated in conjunction with the up-and-down movement of the up and down moving pin 61.

Therefore, the transmission unit 40, which is provided to rotate by the rotation of the shaft portion 81, can utilize its rotational movement to send a signal indicating the absence of the article P. Furthermore, the sell-out display unit 91 which is configured to integrally rotate together with the transmission unit 40, can rotate and move from a standby position, which is not visible from the exterior of the main body portion 2, to an operating position, which is visible therefrom, thereby displaying the sold-out status of the articles P. Additionally, since the transmission unit 40 is accommodated internally and not visible from the outside of the accommodation unit 20 and the main body portion 2, the transmission unit 40 is protected by the main body portion 2 and the accommodating unit 20.

Since the sell-out display unit 91 of the item supply device 1 according to this embodiment is configured to be capable of descending by its own weight when the engagement of the shaft portion 81 is released, there is no need for a special power source for moving' the sell-out display unit 91.

Also, in the article supply device 1 according to the present embodiment, the magnet provided in the transmission unit 40 is configured to be magnetically attracted to a metal part provided in the main body portion 2 when the engagement of the shaft portion 81 is released and it rotates. Therefore, the rotational state of the shaft portion 81 can be maintained by the magnetic absorption force between the magnet and the metal part.

In the article supply device 1 according to the present embodiment, since the up and down moving pin 61 is pressed to a position of a lower side of the article placement portion 20*b*, against an urging force of the compressed coil spring 63 due to the weight of the article P, the absence of the articles P can be can easily detected, since when the articles P run out, the pressure is released so that the up and down moving pin 61 moves up. Moreover, since the article placement portion 20*b* accommodates the articles P in a stacked and aligned state, application of the weight of the articles P can be surely applied to the up and down moving pin 61, the articles can be easily detected.

In this embodiment, the supply unit 35, the up and down moving pin 61, the transmission unit 40, and the sell-out display unit 91 are provided in the accommodation unit 20, it is possible to simplify the configuration of the main body portion 2. Furthermore, since the accommodation unit 20 is configured so as to be attachable to or detachable from the main body portion 2, the supply unit 35, the up and down moving pin 61, the transmission unit 40, and the sell-out display unit 91 can be easily assembled and maintained.

In this embodiment, since the opening 20*dh*, which the sell-out display unit 91 protrudes from the outer surface of the main body portion 2, is formed to have a cross-sectional shape in a moving direction of the sell-out display unit 91, which is formed as a member in a plate shape, the size of the opening 20*dh* can be configured so as to be in a slit shape of the minimum necessary size. As a result, the opening 20*dh* does not become a large opening, zo that it is possible to enhance the dust resistance property in the inside of the accommodation unit 20 and that of the main body portion 2, and to prevent entry of fingers, thereby ensuring safety.

Thus, an embodiment of the present invention has been explained, but the present invention can be appropriately modified within the scope of its technical concept. For example, the structure of the article supply device 1 in the above embodiment, and the structure of the accommodation unit 20 are not limited to those shown in the drawings. Moreover, in the above-described embodiment, the metal part 43 absorbed (magnetic adhesion) with the second member 42 of the transmission unit 40 is provided in the bottom wall portion 20*d* of the accommodation unit 20, but it is not limited thereto. For example, the metal part 43 may be provided in the main body portion 2, or the metal included in the first member 41 may be used as the metal part 43.

Items set forth below are disclosed in this specification.

(1) An article supply device capable of supplying articles, comprises a main body; an accommodation unit which accommodates the articles; a supply unit which supplies one of the articles accommodated in the accommodation unit; a detection unit which detects presence or absence of the articles accommodated in the accommodation unit, a transmission unit which transmits a signal indicating the absence of the articles accommodated in the accommodation unit; and a sold-out display unit which displays the absence of the articles accommodated in the accommodation unit, wherein the transmission unit and the sold-out display unit are configured to operate integrally based on an operation of the detection unit.

(2) In the article supply device of (1), the transmission unit and the sold-out display unit are configured so as to be rotatable.

(3) In the article supply device of (2), an angle of a rotation operation of the transmission unit and that of the sold-out display unit is less than 90 degrees.

(4) In the article supply device of (2) or (3), the transmission unit and the sold-out display unit are rotatable at the same angle.

(5) In the article supply device of any one of (1)-(4), the transmission unit and the sold-out display unit are supported by a shaft, and the shaft supports the transmission unit and the sold-out display unit in a same direction of the shaft.

(6) In the article supply device of (5), an engaging portion, which can be engaged with another member extending in a cross direction with respect to an axis center of the shaft, is provided on the shaft, and the engaging portion releases a state of an engagement with the another member when no article is accommodated in the accommodation unit.

(7) In the article supply device of (6), the sending-out portion is configured not to transmit a signal indicating the absence of articles in a state where the shaft is engaged with the another member at the engaging portion, and is configured to transmit the signal indicating the absence of articles in a state where the engagement of the shaft is released.

(8) In the article supply device of (6) or (7), the sold-out display unit is configured to be invisible from an outside of the main body in the state where the shaft is engaged, and visible from the outside of the main body in the state where the engagement of the shaft is released.

(9) In the article supply device of any one of (6) or (8), the sold-out display unit is configured to be capable of descending due to its own weight in the state where the engagement of the shaft is released.

(10) In the article supply device of any one of (6) or (9), the transmission unit includes a magnet, and is configured to be capable of attaching to a metal part provided in the main body in the state where the engagement of the shaft is released.

(11) In the article supply device of any one of (6) or (10), the transmission unit is configured to be invisible from the outside of the main body in both the state where the engagement of the shaft is released and the state where the shaft is engaged.

(12) In the article supply device of any one of (1) to (11), the detection unit is configured to be retractable within the accommodation unit, and to be maintained in a retracted state due to a weight of the articles within the accommodation unit, in a state where the articles are accommodated in the accommodation unit.

(13) In the article supply device of any one of (1) to (12), the supply unit, the detection unit, the transmission unit, and the sold-out display unit are provided in the accommodation unit.

(14) In the article supply device of any one of (1) to (13), the accommodation unit is detachably configured with respect to the main body.

(15) In the article supply device of any one of (1) to (14), the accommodation unit is configured to accommodate the articles in an aligned state.

(16) In the article supply device of any one of (1) to (15), the accommodation unit has an opening at its bottom through which the sold-out display unit is retractable.

(17) In the article supply device of (16), the opening has a shape corresponding to a cross-sectional shape of the sold-out display unit.

REFERENCE NUMERALS

1 Article supply device
2 Main body
4 Operation unit
5 Coin insertion part
20 Accommodation unit
35 Supply unit
40 Sending-out unit
43 Metal part
61 Up and down' moving pin (Detection unit)
64 Engaging projection (another member)
81 Shaft
82 Engagement portion
91 Sell-out display unit
P Article

The invention claimed is:

1. An article supply device capable of supplying articles, comprising:

a main body;

an accommodation unit which accommodates the articles;

a supply unit which supplies one of the articles accommodated in the accommodation unit;

a detection unit which detects presence or absence of the articles accommodated in the accommodation unit, a transmission unit which transmits a signal indicating the absence of the articles accommodated in the accommodation unit; and a sold-out display unit which displays the absence of the articles accommodated in the accommodation unit, wherein the transmission unit and the sold-out display unit are configured to operate integrally based on an operation of the detection unit, and the detection unit is configured to be retractable within the accommodation unit and to be maintained in a retracted state due to a weight of the articles within the accommodation unit, in a state where the articles are accommodated in the accommodation unit.

2. The article supply device according to claim 1, wherein the transmission unit and the sold-out display unit are configured so as to be rotatable.

3. The article supply device according to claim 2, wherein an angle of a rotation operation of the transmission unit and the sold-out display unit is less than 90 degrees.

4. The article supply device according to claim 2, wherein the transmission unit and the sold-out display unit are rotatable at the same angle.

5. The article supply device according to claim 1, wherein the transmission unit and the sold-out display unit are supported by a shaft, and the shaft supports the transmission unit and the sold-out display unit in a same direction of the shaft.

6. The article supply device according to claim 5, wherein an engaging portion, which can be engaged with another member extending in a cross direction with respect to an axis center of the shaft, is provided on the shaft, and the engaging portion releases a state of an engagement with the another member when no article is accommodated in the accommodation unit.

7. The article supply device according to claim 6, wherein the sending-out portion is configured not to transmit a signal indicating the absence of articles in a state where the shaft is engaged with the another member at the engaging portion, and is configured to transmit the signal indicating the absence of articles in a state where the engagement of the shaft is released.

8. The article supply device according to claim 6, wherein the sold-out display unit is configured to be invisible from an outside of the main body in the state where the shaft is engaged, and visible from the outside of the main body in the state where the engagement of the shaft is released.

9. The article supply device according to claim 6, wherein the sold-out display unit is configured to be capable of descending due to its own weight in the state where the engagement of the shaft is released.

10. The article supply device according to claim 6, wherein the transmission unit includes a magnet, and is configured to be capable of attaching to a metal part provided in the main body in the state where the engagement of the shaft is released.

11. The article supply device according to claim 6, wherein the transmission unit is configured to be invisible from the outside of the main body in both a state where the engagement of the shaft is released and the state where the shaft is engaged.

12. The article supply device according to claim 1, wherein the supply unit, the detection unit, the transmission unit, and the sold-out display unit are provided in the accommodation unit.

13. The article supply device according to claim 1, wherein the accommodation unit is detachably configured with respect to the main body.

14. The article supply device according to claim 1, wherein the accommodation unit is configured to accommodate the articles in an aligned state.

15. The article supply device according to claim 1, wherein the accommodation unit has an opening at its bottom through which the sold-out display unit is retractable.

16. The article supply device according to claim 15, wherein the opening has a shape corresponding to a cross-sectional shape of the sold-out display unit.

* * * * *